UNITED STATES PATENT OFFICE.

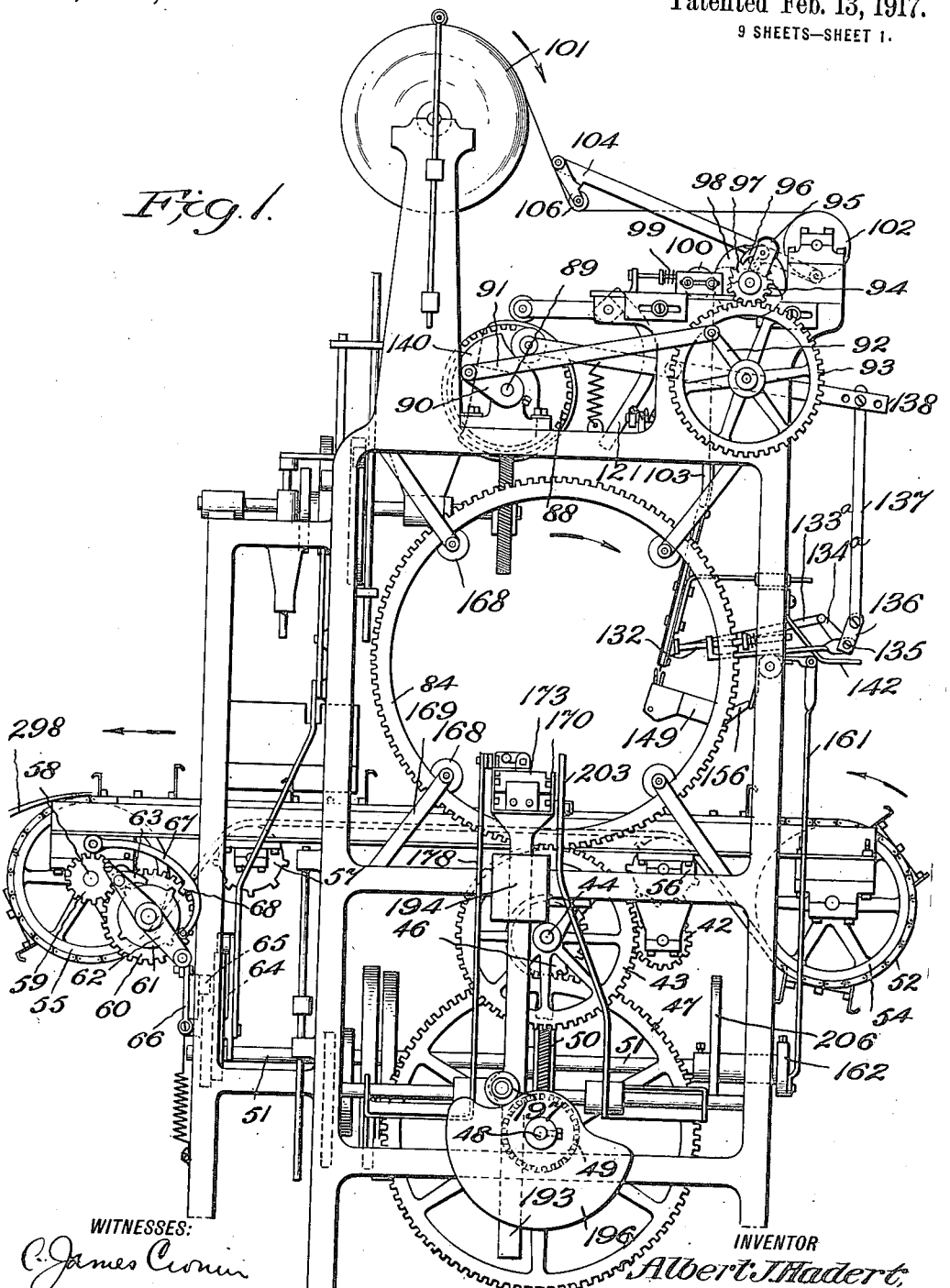

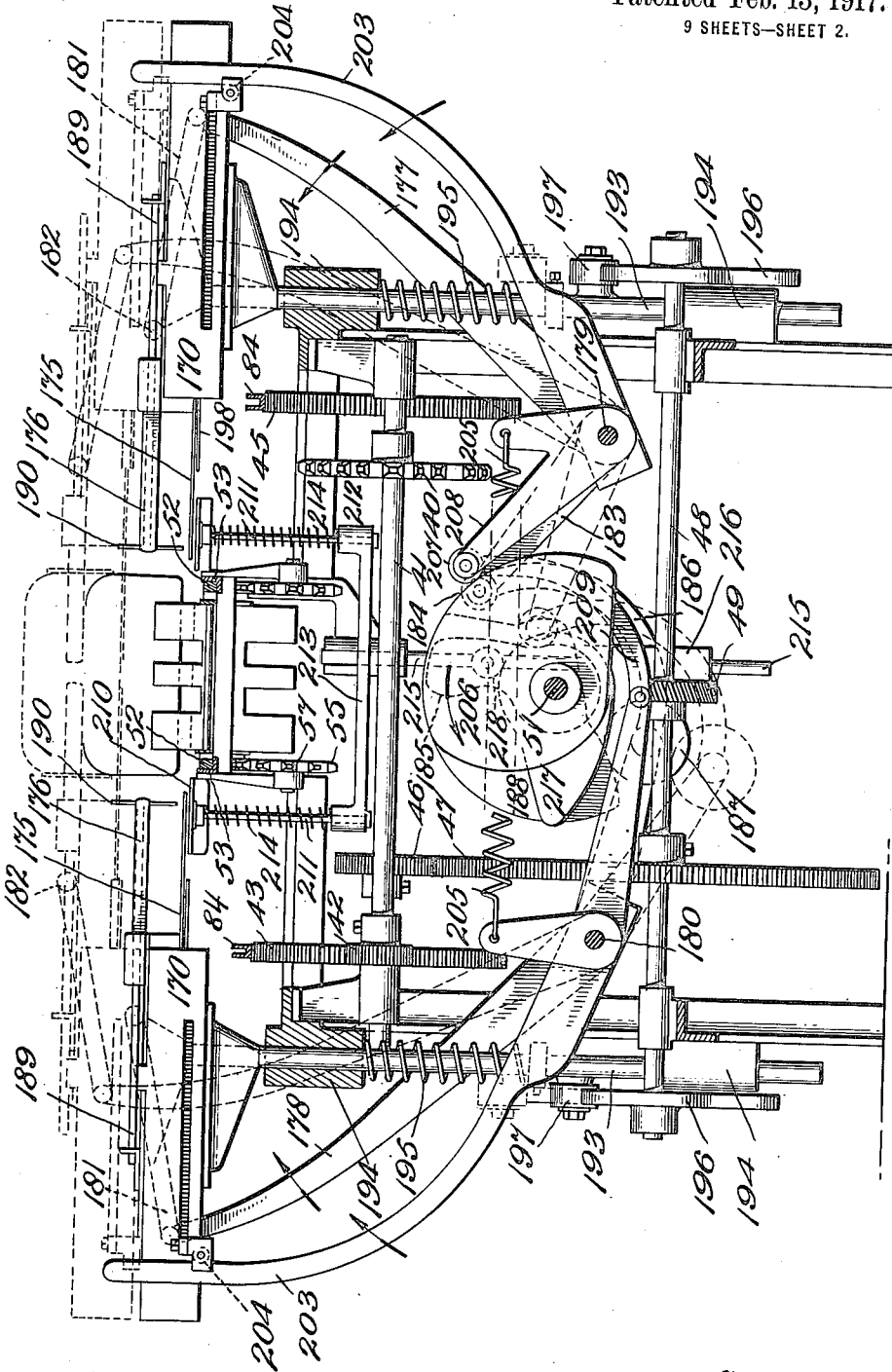

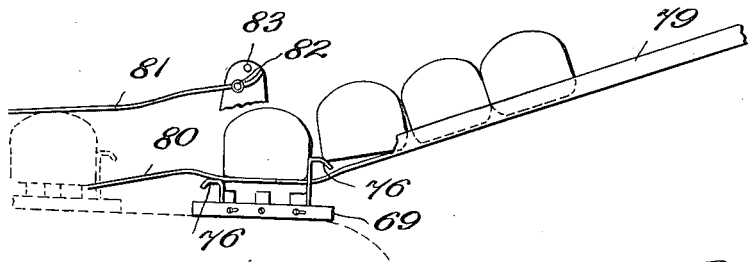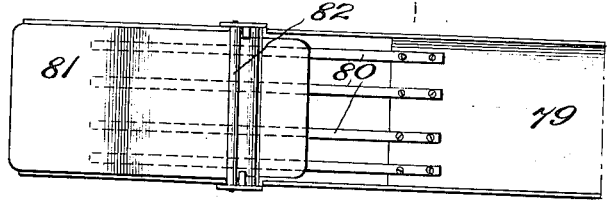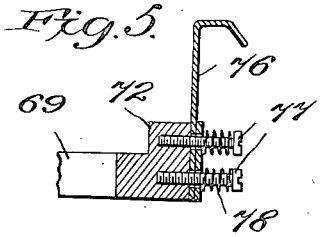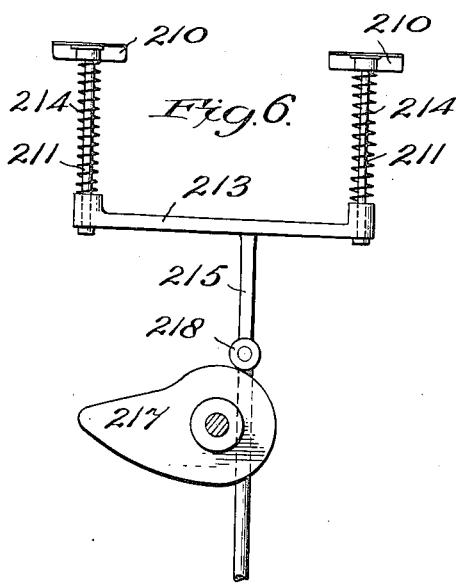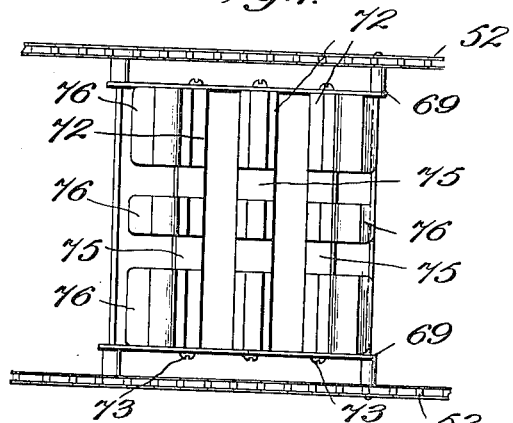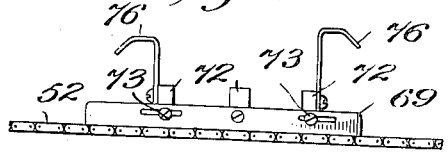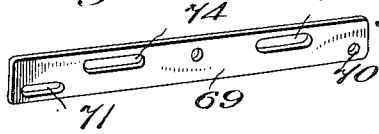

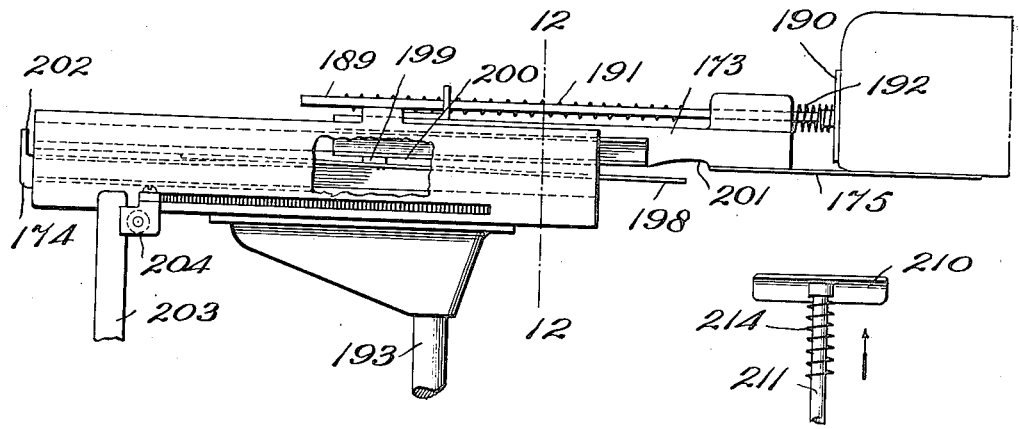
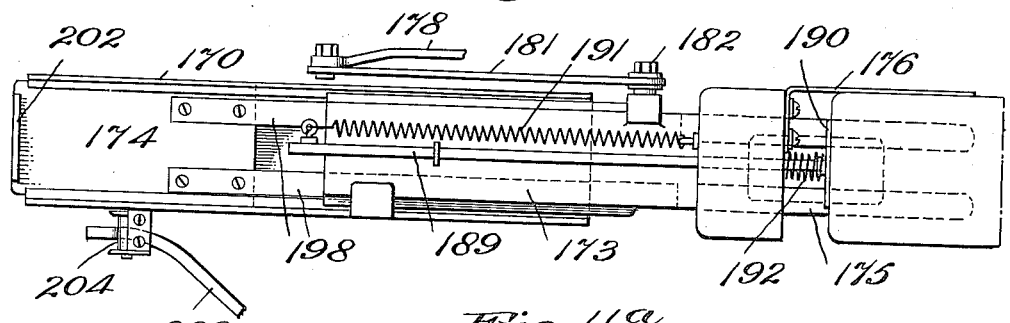
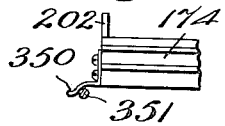
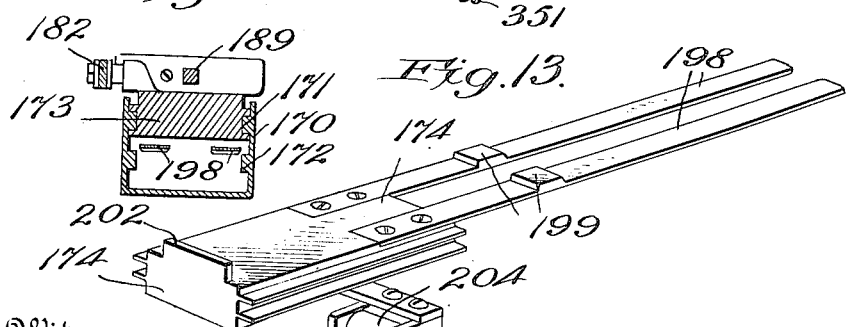

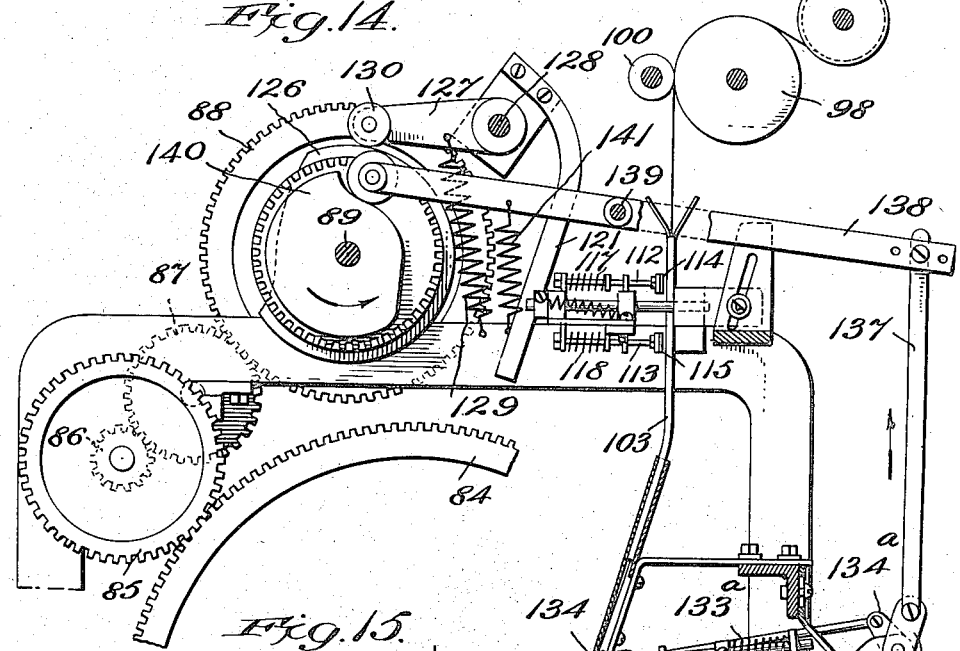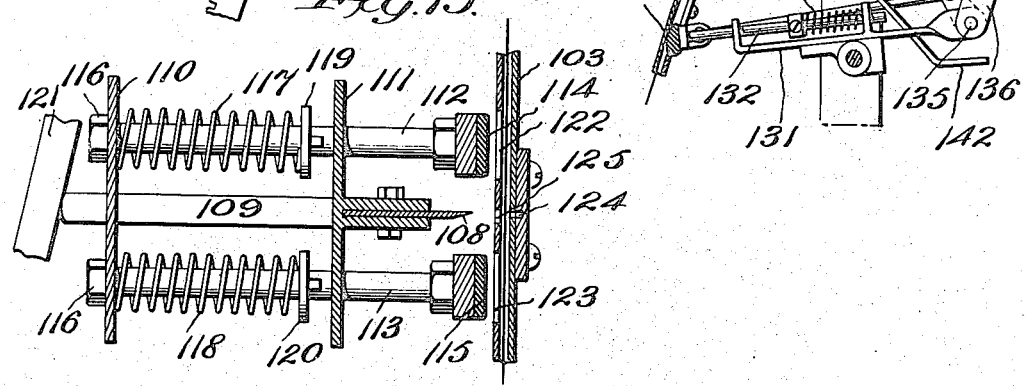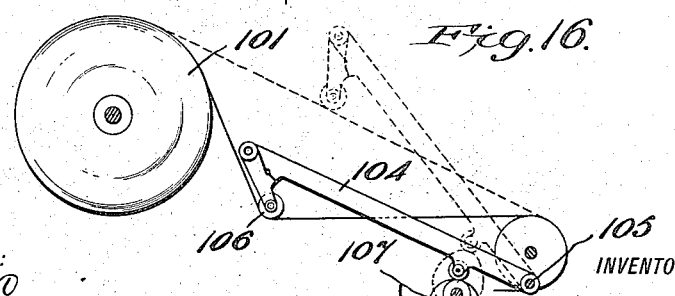

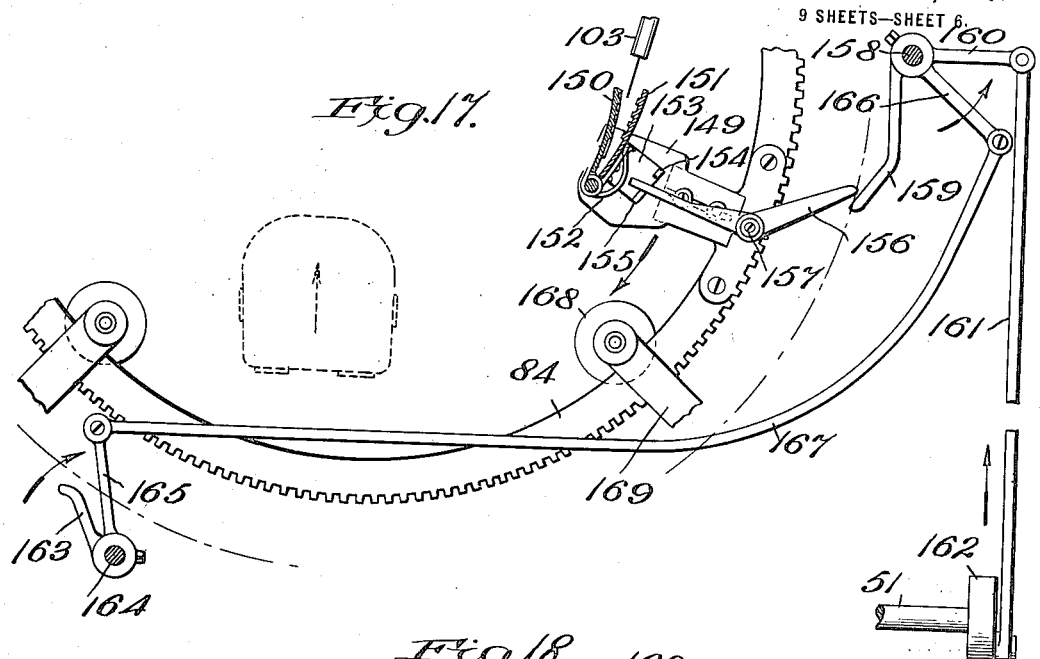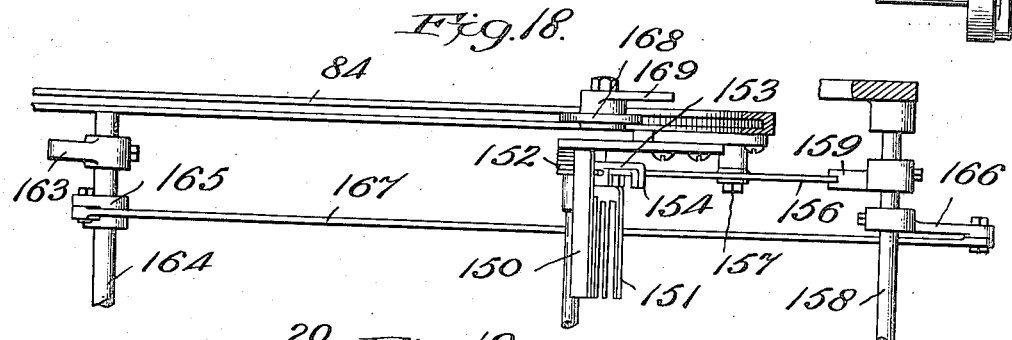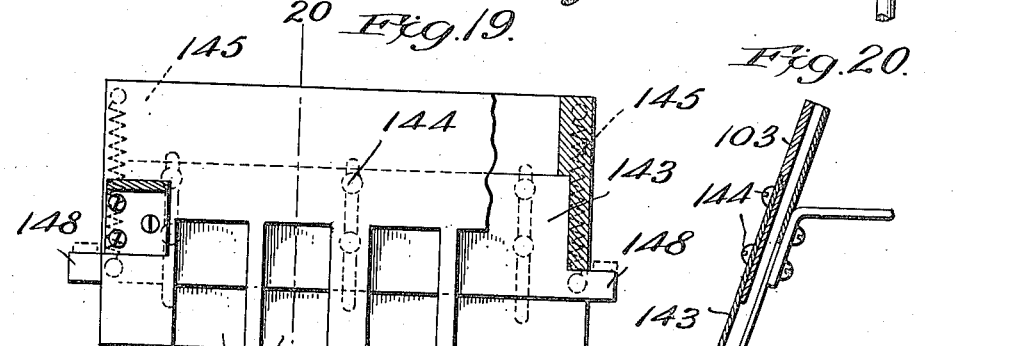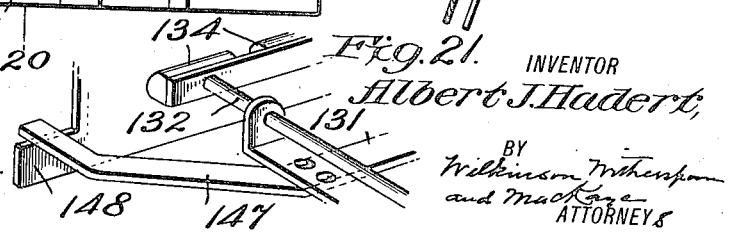

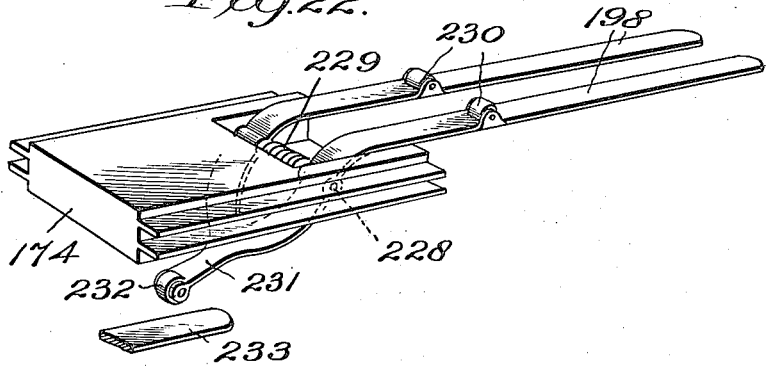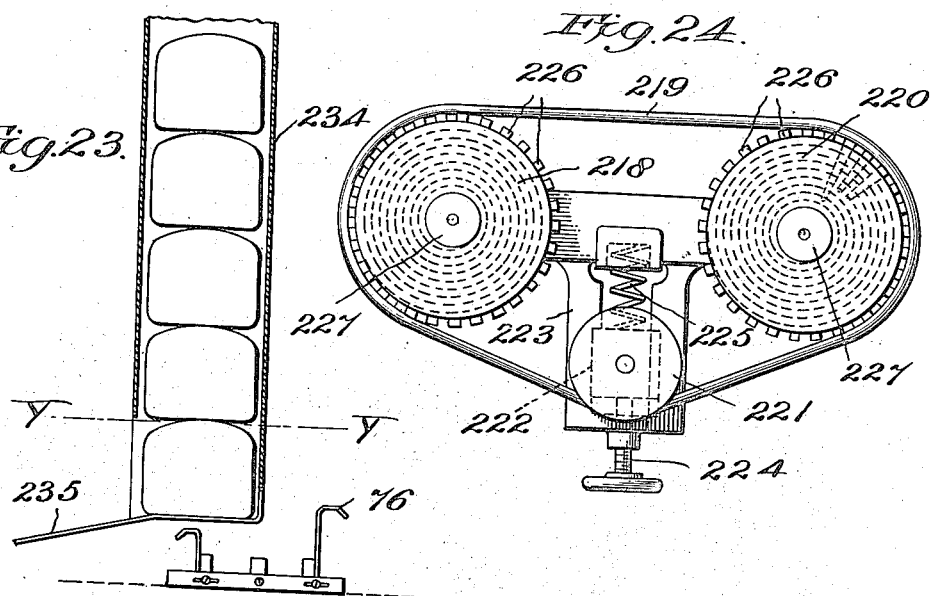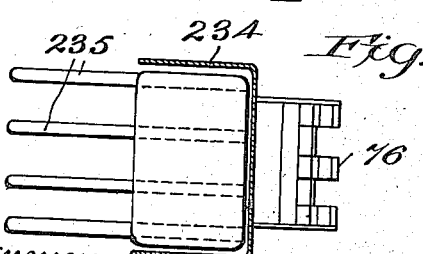

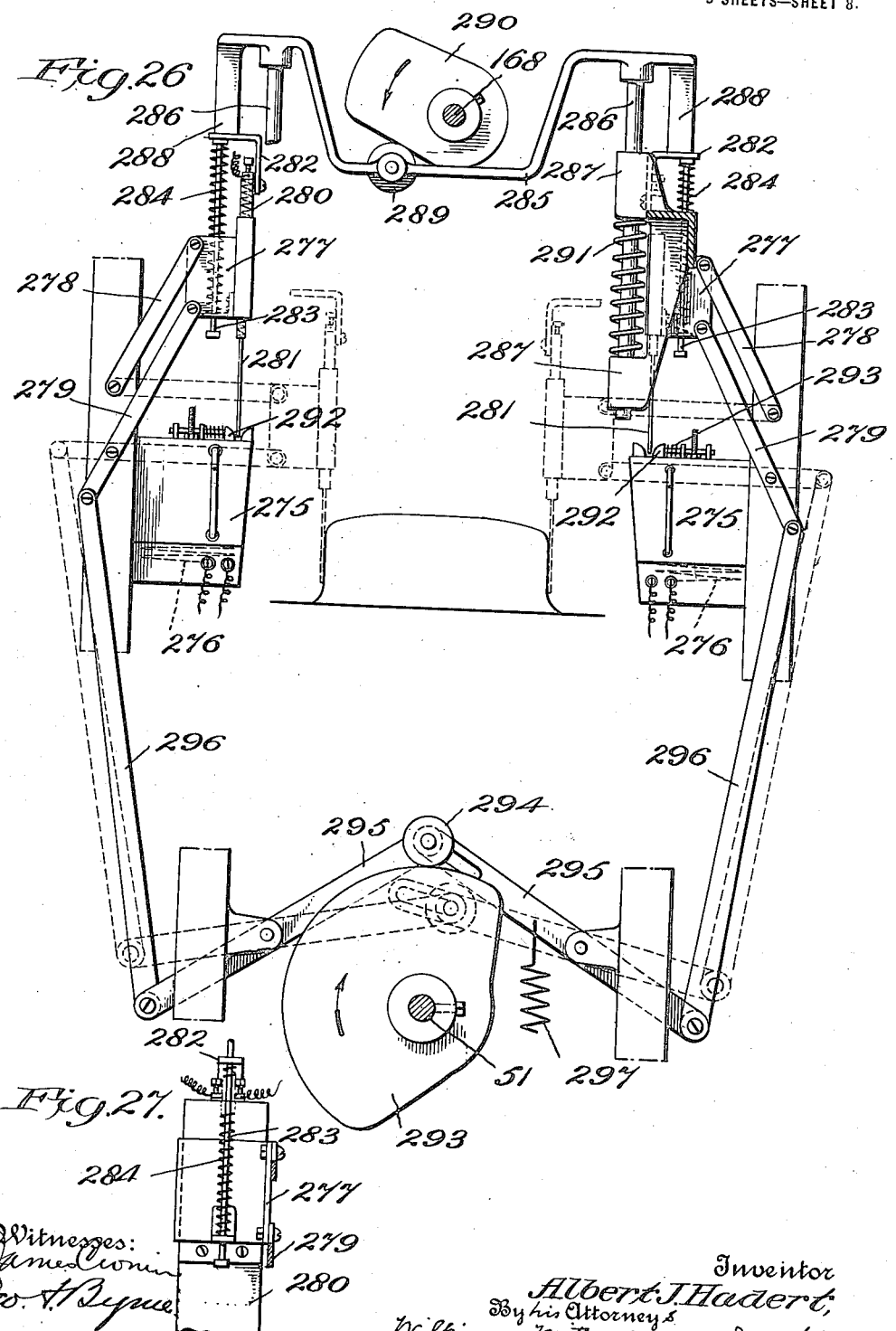

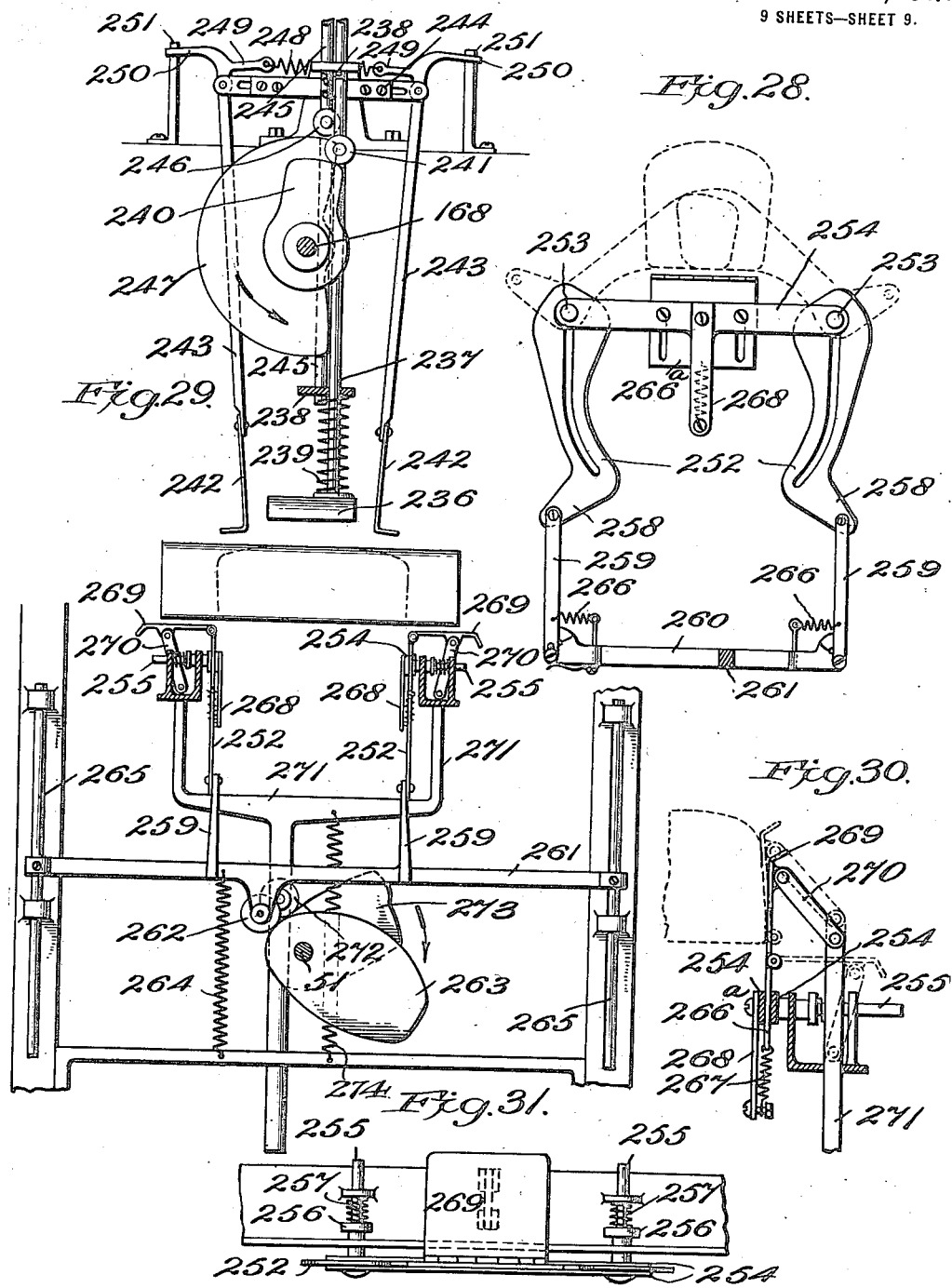

ALBERT J. HADERT, OF NEW ROCHELLE, NEW YORK.

WRAPPING-MACHINE.

1,215,930.   Specification of Letters Patent.   Patented Feb. 13, 1917.

Application filed March 19, 1913. Serial No. 755,286.

*To all whom it may concern:*

Be it known that I, ALBERT J. HADERT, a citizen of the United States, residing at New Rochelle, in the State of New York, have invented certain new and useful Improvements in Wrapping-Machines; and I do hereby declare the following to be a full, clear, and exact description of the invention, such as will enable others skilled in the art to which it appertains to make and use the same.

The present invention relates to an improved machine for wrapping parcels generally, and more particularly for wrapping loaves of bread rapidly and hygienically. The machine in question is self-feeding and is so arranged as to act upon two articles simultaneously. For this purpose a suitable conveyer carries a succession of loaves or other articles to be wrapped, first to what I term a "paper-applying unit" (by means of which a sheet of paper is made to surround the article) and thence to a folding and sealing unit, acting automatically in coöperation with the paper applying unit. The second named unit completes the folding of the sheet around the article and securely seals the package. Wherever a "loaf" is referred to hereinafter, any article intended to be wrapped is to be understood, and the term "paper" is intended to cover any suitable enveloping material.

The advantages of the invention will appear in connection with the description of its various parts given hereinafter.

Certain preferred embodiments of the invention are illustrated in the accompanying drawings, wherein Figure 1 is a side view of the device with certain details omitted for the sake of clearness, Fig. 2 is a cross section of the lower part of the machine also omitting certain details to avoid confusion, Fig. 3 is a side view of one form of loaf feed at the point of delivery to the conveyer, Fig. 4 is a plan of the same, Fig. 5 is a section of a detail in the loaf holder, Fig. 6 is an elevation of the paper securing device, Fig. 7 is a plan of a preferred loaf holder, Fig. 8 is a side view of the same, Fig. 9 is a perspective view of a side plate for the same, Fig. 10 is an elevation of the means for lifting the loaf and controlling the paper thereon on one side of the machine, Fig. 11 is a plan view of the same, Fig. 11ª shows a detail catch on the "tension body", Fig. 12 is a cross section thereof on the line 12—12 in Fig. 10, Fig. 13 shows certain parts thereof in perspective, Fig. 14 is a side view of a preferred form of paper feed, Fig. 15 is a sectional view of one form of paper cutter, Fig. 16 is a side view of a tension device applicable to the machine, Fig. 17 is an elevation of a part of the paper-applying device, Fig. 18 is a plan of the same, Fig. 19 is a detail of a part of the paper pusher, Fig. 20 is a sectional view of the same on the line 20—20 of Fig. 19, Fig. 21 is a perspective view of another part of the same, Fig. 22 shows in perspective a modified form of paper tension device, Fig. 23 is a sectional view of a modified form of loaf feed, Fig. 24 shows a modified form of gear applicable to the paper feed, Fig. 25 is a sectional view of the same on the line *y—y* of Fig. 23, Fig. 26 is an elevation of a preferred form of sealing device, Fig. 27 is an elevation of the self-heating sealing plate used in said device, Fig. 28 is an elevation of the preferred side folder, Fig. 29 is an elevation of the principal elements of the folding devices assembled, Fig. 30 is a sectional detail showing the final folder, and Fig. 31 is a plan view of the side folder and final folder on one side of the machine.

Before describing the elements of my machine and their operations it will be well to point out the particular system of driving mechanisms by which these elements are brought into united action in that embodiment of my invention which I have illustrated.

Referring to Figs. 1 and 2, the power is preferably applied from any source of power to the sprocket wheel 40 on the shaft 41, carrying the pinion 42. This drives the gear wheel 43 on the cross shaft 44, which carries a second similar gear 45 near its opposite end, at the other side of the machine. The shaft 44 also carries a pinion 46 which drives the large gear 47 on the cross cam shaft 48, near the middle of which is mounted the spiral gear 49. This gear drives the spiral gear 50 set at right angles to the former, and mounted upon the main cam shaft 51 which is set longitudinally under the machine.

The conveyer proper for carrying the loaves through the machine consists of two chains 52 moving horizontally in guides 53 between sprocket wheels 54, 55, and returning underneath themselves over idlers 56, 57. The arrows in Fig. 1 show the direction of movement. Any suitable means may be used for imparting intermittent movement to these chains, and I have illustrated the following.

The sprocket wheels 55 at one end are mounted upon a cross shaft 58 turned by a pinion 59 which is engaged by the driving pinion 60. On the same shaft with the pinion 60 is fixed a ratchet wheel 61 having four teeth, and there is loosely mounted upon the same shaft a lever 62 carrying the pawl 63 arranged to drop behind one tooth at a time and then push the ratchet wheel forward a quarter revolution, for each back and forth swing of the lever 62. This swinging is accomplished by means of a cam 64 on the main cam shaft 51, supporting a roller 65 to which is attached the link 66, pivotally connected to one end of the lever 62, preferably by a universal joint.

In Fig. 1 the pawl 63 is supposed to be moving backward to engage a new tooth on the wheel 61. As the lever 62 continues to swing, it lifts the detent arm 67, to let the ratchet turn forward during the reverse swing, and, as the ratchet approaches the end of each alloted movement, the tooth 68 on the detent arm falls into position to prevent any excess of movement due to inertia. The parts are so proportioned that each back and forth swing of the lever 62 takes place in the proper idle interval, and carries a loaf forward from due position in the paper applying unit to due position in the folding and sealing unit.

The preferred loaf carrier is best shown in Figs. 7, 8 and 9, and comprises side links 69 connected to the chains 52 by pins entering openings 70 and 71, one of which is elongated to permit the loaf carrier to pass around the curved paths followed by the chains at the ends of the machine. Between the links 69 extend the lifting blocks 72, made adjustable for different sizes of loaf by supporting screws 73 passing through slots 74 in the links 69. The lifting blocks 72 are preferably slotted as shown at 75 and are provided with outwardly bent confining fingers 76. The rear fingers are preferably made higher than the forward fingers, for a purpose hereinafter explained. As shown in Fig. 5, the rear fingers are mounted so as to slide on pins 77, being held to their work by springs 78.

The preferred feeding means are shown in Figs. 3 and 4. The loaves are placed in a row on an inclined chute 79, terminating in extensions or depositing fingers 80 which are so shaped (as shown in Fig. 3) as to support the lowermost loaf and prevent its sliding under the pressure of the others. These fingers are placed over the rear sprocket wheels 54, so that, as each loaf carrier comes up under them, the forward retaining fingers 76 clear the loaf supported on the extensions 80, and the rear fingers 76 rise between said extensions 80, so as to separate the foremost loaf from its fellows by a yielding blow, thanks to the springs 78 (Fig. 5). This action is plainly shown in Fig. 3.

As the forward motion of the loaf-carrier continues, the loaf is pushed along the extensions 80, which slope downward, as shown, entering the slots 75 in the lifting blocks and depositing the loaf on said blocks between the retaining fingers. It is desirable that this action be accomplished as rapidly as possible; and, in order to prevent the loaf from being thrown out by the sudden movement, a safety plate 81 is pivoted at 82 in a suitable position to bear not too heavily on the loaf as it is pushed forward. The rear of the plate bears on the stops 83, when a loaf is not passing.

As shown in Fig. 3, the rear retaining fingers carry supporting lips which tilt upward the forward edge of the second loaf and lessen the danger of catching or sticking of the column of loaves.

The paper applying unit may be supplied by any appropriate paper feed, and I have shown a preferred form of such feed in Figs. 1, 14, 15, 16, 19, 20 and 21.

The paper feed is preferably driven from the main gears on the jaw carrier hereinafter described. These gears are duplicated on the opposite sides of the machine and are shown at 84. They are driven from below by the gears 43 (see Figs. 1 and 2). For clearness, the train of gearing between the gears 84, and the main cam shaft of the paper feed is omitted from Fig. 1, but it is shown in Fig. 14 in the pinions 85, 86, 87, and 88, the last of which is fast on the main cam shaft 89 of the paper feed.

The end of the shaft 89 is furnished with a crank arm 90, connected by the link 91 with the crank arm 92 on the gear 93. As the crank 90 revolves it moves the gear 93 back and forth through an arc less than 180 degrees, thus causing it to act as a curved reciprocating rack. A pinion 94 (Fig. 1) shown partly broken away engages the rack 93, and carries with it an arm 95 bearing a pawl 96 which is thereby caused to impart an intermittent forward rotation to the ratchet wheel 97. This wheel is fast upon the same shaft with the friction feed roller 98 against which the spring 99 presses the second feed roller 100.

The paper is led from the loose storage reel 101 over the roller 102, and thence between the rollers 98, 100, by movement of which it is intermittently projected into the guide chute 103 in proper lengths. In order to keep the paper taut despite any overrunning of the reel 101, I prefer to use a tension device, which may be made as shown in Figs. 1 and 16. The lever 104, pivoted at 105, carries an offset roller 106, which normally rests in a bight of the paper (see Fig. 16) but during the time of advance, the paper is relieved of the tension by the cam 107 on the shaft which carries the roller 98, as shown in dotted lines in Fig. 16.

The paper web is cut across at proper distances apart by suitable automatic mechanism, and my preferred construction for this purpose is shown in Figs. 1, 14 and 15.

A serrated cutter of usual design 108 is mounted upon a frame 109, which comprises plates 110, 111 carrying the pressure rods 112, 113, preferably carrying pressure pads 114 and 115 placed in advance of the cutting edge of 108. These rods slide in apertures in the plates 110, 111, and are kept normally in the position shown in Fig. 15 by the nuts 116 and by the springs 117, 118, confined between the plate 110 and the abutments 119, 120, fixed on said rods. When the frame 109 is pushed forward by the lever 121, during an interval of rest of the paper, the springs 117, 118 cause the pressure pads 114, 115, to move with and in advance of the cutter 108; until, having passed through the apertures 122, 123, in the chute 103, they have pressed the paper against the back of the chute on opposite sides of the incision-slot 124. The springs then hold the pads firmly against the paper, while the edge 108, passes through the incision aperture 125, and through the paper into the slot 124. This action either entirely or substantially severs the paper, so that when the paper delivering device acts, the web will be severed along the line so cut. Obviously the slot 124 may or may not be open all the way through the chute wall. The appropriate movements of the lever 121 for carrying out this cutting operation during intervals of rest in the paper feed are accomplished by the cam 126 on the shaft 89, which acts through the arm 127 fixed to a shaft 128, to which the lever 121 is also fixed. The spring 129 keeps the roller 130 on the arm 127 down against the cam 126, and this spring supplies the power for actuating the cutter 108.

The actual delivery of severed sheets to the wrapping machine is accomplished by what may be termed a "sheet accelerator"; which, in my preferred form shown, comprises the following constructions (see Figs. 14, 19, 20 and 21).

The simplest form is shown in Fig. 14. Here a frame 131, pivoted to the general framework of the machine, carries a sliding delivery frame 132, normally pushed forward by a spring 133 or the like, and preferably provided with a soft friction pad or pads 134 at its extremity. Pivotally attached near the front of the delivery frame 132 is a rod 133ᵃ, the opposite end of which is pivoted to the arm 134ᵃ. This arm is fixed to a shaft 135 carried by a rearward extension of the frame 131, and said shaft also carries a second arm 136 to the end of which is pivoted the connectiong rod 137. The opposite end of this rod 137 is pivoted to the end of a lever 138 pivotally mounted at 139, and carrying a roller which is kept in contact with the cam 140 by the spring 141.

In Fig. 14 the sheet accelerator is supposed to have completed the forward movement, corresponding to the action of the rod 137 in the direction of the arrow. Further movement of the cam 140 as shown by the arrow thereon will cause depression of the rod 137. As the arm 136 is near the dead center, the first effect of depressing the rod 137 will be to cause the pad 134 to slip idly upward over the smooth front surface of the paper chute (the severed sheet having been withdrawn as hereinafter described). This will continue until the frame 131 comes against the stop 142, when further movement of the rod 137 will rotate the shaft 135, and the arm 134ᵃ and rod 133ᵃ will draw the pad 134 back, and permit the intermittently fed paper to pass down the chute.

Almost simultaneously with the next operation of the cutter 108, the rod 137 will be pulled upward, first causing the shaft 135 to turn so as to throw the pad forward against the paper and then flipping the severed sheet quickly into the moving jaws by a downward swing of the frame 131 (see Fig. 1).

The form of sheet accelerator just described is a very simple one, and I prefer the form shown in Figs. 19, 20 and 21. Here a slidable plate 143 is held to the front of the paper chute, as by screws 144, and is normally held up by springs 145. When the pads 134 are first moved forward to engage a freshly severed sheet, they pass through openings 146 in the rear of the chute and pinch the paper against the slidable plate 143, so that there is no slip between the paper and chute when the former is flipped forward. In order to insure positive movement of the plate 143 downward with the pads and the paper, I prefer to provide arms 147 on opposite sides of the frame 132 (one of which is shown in Fig. 21) which arms press downward upon projections 148 on the sides of the plate 143. This construction also avoids friction of the pads on their upward movement.

It is to be understood that my machine is capable of use in combination with means for feeding separate or already severed sheets, instead of comprising means for feeding and cutting a single long sheet. The term "severed" as applied to the sheets refers to sheets already for application to the loaf or other article to be wrapped.

By the means thus far described the paper passes from the paper feed proper to the paper applying unit, whereby it is first applied around the loaf, preparatory to actual folding upon the same. For this purpose a "loaf handler" is provided to place the loaf in a favorable position, while a "paper conveyer" carries the sheet around the loaf to form an open-ended tube suitable for final folding. It is to be understood that the paper is dragged past the pad 134, the friction of which, pressing forward against the chute, preserves a suitable tension and prevents wrinking or falling of the sheet.

The gears 84, revolved as already described, support the jaws carriers 149 which are carried in an orbit around a raised loaf (see dotted lines in Fig. 17) and make two turns for each delivery of one sheet by the accelerator. At the beginning of the first turn the jaws are momentarily opened when in position shown in Figs. 1 and 17, and the end of the severed sheet is flipped forward between them, whereupon they close at once and, as their movement is continuous they carry the end of the sheet around under the loaf. As the jaws pass the delivery position the second time they are not opened, but, after completing application of the sheet to the loaf, they are opened so as to release the paper as they pass under the loaf the second time. Various means may be employed for carrying out this operation, and in Figs. 1 and 17 is shown a preferred construction for this purpose.

Extending from side to side of the machine is a fixed jaw 150, and a movable jaw 151 is pivoted thereto and is normally held firmly in contact therewith by a spring 152. On the movable jaw 151 is a plate 153 having two projections 154, 155, between which plays the end of a bent lever 156 pivoted to the jaw holder at 157. The arrow in Fig. 17, near the jaws, shows the direction of movement of the jaw holder.

The revoluble shaft 158 carries a trip arm 159 which is brought into the position shown in Fig. 17 (up to the dotted circular arc) once in two revolutions of the wheel 84, so as to trip the lever 156 and make it open the jaws momentarily. Between times the arm 159 is out of the path of the lever 156. The proper movement of this arm is preferably imparted by an arm 160 on the shaft 158, which arm is controlled by a rod 161 moved by a disk 162 to which it is pivotally and eccentrically connected. This disk is on the shaft 51 already described.

In order to correlate the releasing movement of the jaws I prefer to employ a releasing trip arm 163 on a shaft 164 provided with an arm 165 connected to a like arm 166 on the shaft 158 by a curved rod 167, whereby movements of the last named shaft will cause the trip arm 166 to move up to the dotted arc in Fig. 17 once for each two revolutions of the jaws, and thus release the paper at the proper moment.

In the form shown I prefer to support the wheel 84 upon rollers 168, carried on arms 169, and entering the groove in the wheel 84 plainly shown in Fig. 18.

The raising and lowering of the loaf is accomplished by a "loaf handler," associated with "paper adjusters," and preferred forms of which are best shown in Figs. 2, 10, 11, 12 and 13.

On each side of the machine is a lifting box 170 provided internally with guiding ribs 171 and 172 or their equivalents. Upon the upper guides the lifting body 173 is adapted to slide, while the tension body 174 slides on the lower guides 172. The body 173 preferably carries projecting lifting blades 175 and a steadying blade 176 adapted to steady the advancing side of the loaf while it is being lifted.

While the paper-holding jaws are advancing on their first orbital circuit, the first action of the loaf handler is the advance of the body 173, whereby the blades 175 enter the loaf carrier under the loaf and between the blocks 72. This is accomplished by arms 177, 178, pivoted at 179, 180, and pivotally connected by links 181 to studs 182 on the sides of the bodies 173. The full lines and dotted lines in Fig. 2 amply illustrate this movement. To carry out this operation the arm 177 is rigidly connected with a cam-arm 183, having a roller 184 bearing on the cam 185. This arm is pivotally connected by a link 186 to the end of the arm 178, which carries a roller 187 bearing on a cam 188. The cams 185 and 188 are fixed to the shaft 51 and act alternately to thrust the lifting body 173 positively inward and outward. The cam 188, in the form shown, is behind the cam 185 in Fig. 2.

In order to insure proper centering of each loaf before application of the paper thereto, I prefer to associate centering devices with the loaf handling means, and in the form shown (see Figs. 10 and 11) these take the form of suitably guided rods 189, one on each side, each mounted upon one of the bodies 173 so as to slide longitudinally thereon, and each furnished with a centering plate 190 at its end. The relative position of each rod 189 with respect to the body 173 is determined by a long tension spring 191 and a relatively short compression spring 192 of materially superior stiffness. The former spring has its ends connected respectively with one end of the rod 189 and the body 173, while the compression spring is interposed between the body 173 and a fixed part on the rod 189, as, for instance, the centering plate 190. As shown in Fig. 12, each rod 189 is preferably square, or is otherwise arranged to prevent its rotation.

It will be understood that, for some purposes the centering means will be sufficient to grip the loaf for lifting it, the lifting blades being omitted, as well as the steadying blade or blades.

As the bodies 173 move toward each other, as hitherto described, the plates 190 press upon opposite sides of the loaf, and, as the two opposed springs 192 are made as nearly alike as possible, they will act to bring the loaf into a substantially exact middle position.

The lifting blades and centering devices being thus automatically adjusted, and the loaf being steadied by the blade 176, the next movement serves to lift the loaf sufficiently high out of its carrier to permit the paper-conveying jaws to pass under the same. This position is indicated in dotted lines in Fig. 2.

For this purpose I prefer to mount each lifting box 170 upon a substantially vertical lifting stem 193 adapted to slide in guides 194 on the frame, and springs 195 are used normally to preserve the lowered position of the stems shown in Fig. 2. The simultaneous raising of the stems is accomplished by cams 196 acting upon rollers 197 on said stems. These cams are fixed to the rotating cross shaft 48.

By the time the loaf has been raised as described, the jaws bring the advancing edge of the paper sheet under the loaf, and it becomes necessary to hold the sheet up against the bottom of the loaf, during further progress of the jaws.

For this purpose I prefer to employ a "tension body" 174, adapted to slide within the lifting box 170 just under the lifting body 173. The body is now thrust forward, so as to bring the tension blades 198 under the paper and loaf. The blades in question are mounted resiliently, and tend to press upward against the lifting blades just above them, and this tendency is not opposed when the two sliding bodies 173 and 174 are directly over each other. But, when the body 173 is first advanced, projections 199 on the blades 198 ride upon downwardly extending ribs 200 on the body 173, and force the blades slightly downward, as shown in Fig. 10. By this means these blades have plenty of room to advance under the paper sheet without danger of catching and tearing; but, when the tension blades are fully advanced, the projections 199 drop into cavities 201, and the blades 198 resume their normal position with respect to the lifting blades, thus gently squeezing the paper upward against the lifting blades. In order properly to limit the movement of the body 174 and keep it and the body 173 in proper relation at both extremes of their travel, I prefer to employ a stop flange 202 on the body 174, which is normally brought into contact with the rear of the body 173.

In order to produce the movements just described, the lower body 174 is mounted upon the guides 172 within the box 170, and said body is adapted to be pushed forward by a lever 203 acting against a roller 204 projecting from the side of the body. Such a lever is provided on each side, and these levers are preferably mounted to turn upon the shafts 179 and 180 (see Fig. 2). A strong spring 205 connects the levers and acts, when permitted, to pull the levers together and advance the two tension bodies simultaneously. The action of this spring is appropriately controlled by a cam 206 on the shaft 51. This cam acts upon a roller 207 on the arm 208 attached rigidly to one lever 203, and connected by a link 209 with the prolongation of the other lever 203. Thus the one cam 206 pushes apart the two levers at the proper time, against the action of the spring 205. This permits the body 174 to be drawn outward by pressure of the body 173 against the flange 202, when said body 173 is moved outward by the appropriate link 181, as hitherto described. When the tension bodies 174 are to be advanced, the cam 206 permits the spring 205 to act for this purpose.

In Fig. 11ª is shown means which may be employed to insure the tension body 174 remaining stationary until the proper time. This takes the form of a rounded hook, preferably a spring-hook, 350, which engages a suitable bar or the like, 351, on the lifting box. When the body 174 is positively pressed forward by the lever 203, the hook 350 yields, but otherwise its engagement is sufficiently firm to prevent the body 174 from being drawn forward by the body 173 as it is advanced.

As the paper-gripping jaws continue their revolution, they drag the severed sheet out of the control of the accelerator pads 134, and between the tension blades 198 and lifting blades 175, and finally said jaws pass once more under the loaf, causing the two ends of the sheet to overlap beneath the same. In order to preserve this overlap when the jaws release the paper, I provide a sheet-retaining means which acts automatically to press the second lap or fold of the sheet up against that part of the sheet with which it overlaps on the loaf. For this purpose various devices may be employed within the spirit of my invention, the preferred form shown in the drawings being described as follows.

Under each end of the loaf is located a sheet retaining plate or equivalent member 210 preferably spring mounted. In Fig. 2, this mounting is shown in the form of a stem 211 under each plate 210, said stems being mounted so as to slide through sockets 212 on the ends of a cross bar 213. Springs 214 support the plates 210 in the positions shown. The cross bar 213 is carried by a middle stem 215 slidably supported for vertical motion by a socket 216.

The moment the jaws 150, 151 pass under the loaf the second time, the cam 217 acting upon the roller 218, mounted upon the stem 215, moves the plates 210 up against the second paper lap, and almost simultaneously the trip 163 acts to open said jaws and finally release the sheet. The operations so far described serve to place the severed sheet in position in open tubular form around the loaf, so that said sheet overlaps beneath the loaf, and holds it in this position above the loaf carrier on the main conveyer.

While the jaws 150, 151 are continuing their orbital progress toward the beginning of a new cycle of operation, the cams 196 and 217 act together to permit the loaf lifting means and the sheet retaining means to move downward until the loaf rests in normal position within its carrier. The plates 210 continue moving down to the position shown in Fig. 2, while the cam 185 causes the lifting body and blades to be withdrawn, carrying the tension body and blades with them. It may be remarked in this connection that, as soon as the loaf rests within its carrier, the blades beneath it are relieved of its weight, and no opposition to smooth withdrawal of the tension blades is afforded.

As soon as the lifting and tension blades have been withdrawn, the automatic forward movement of the conveyer takes place, as heretofore described, bringing a new loaf into position for receiving a new sheet, and at the same time carrying forward the loaf already supplied with paper to the folding unit. Before describing the action of this last named unit, reference will be had to certain modifications which may be noted as among the many possible within the scope of my invention.

The principle of continuous movement of the jaws 150, 151 combined with variable movement of the paper feed is not essential. Where the jaws are so operated as to be momentarily arrested or slowed up to receive the advancing sheet, the paper feed may be advanced continuously and uniformly. In this case, as the adjustment of movement is important I should prefer to employ some transmission means for the paper feeding power which would permit of accurate variation in speed proportion, and in Fig. 24 I have shown an example of such a transmission.

Here the motion of a pulley 218 is transmitted by a belt 219 to a second pulley 220 from which power is taken to drive the paper feed. The belt 219 is kept taut by a roller 221, mounted on a block 222 sliding between guides 223. The pressure of the roller upon the belt may be governed either by the screw 224 or the spring 225 or both. Each pulley 218, 220 is constructed on the principle of a spiral lathe-chuck, so that the outer tips of the wedges 226 serve as the peripheries of the pulleys, and the virtual diameter of each pulley is governed by turning the setting disks 227 in a manner well known in chucks. Thus small and exact changes in the speed-proportions of transmission may be carried out.

In Fig. 22 is shown a modified form of paper tension device. Here the tension blades 198 are pivoted at 228 upon the body 174, and are normally elevated by a spring 229. The projections 199, hitherto described, are replaced by rollers 230, which have the functions of said projections with lessened friction. The rear ends of the blades are continued backward and downward and join in a tongue 231 supplied with a roller 232, which runs along a track 233 when the box 170 is in the lowered position shown in Fig. 2 in full lines. In this position the pressure of the track raises the tongue 231 and depresses the outer ends of the blades, thus positively freeing the blades from the paper, to prevent all danger of catching as said blades are withdrawn.

In Figs. 23 and 25 is shown a modified form of means for delivering the loaves to the conveyer. Here a vertical chute 234 is used, at the bottom of which is a grid with outward and downwardly sloping portions 235 as shown in Fig. 23. The openings in this grid are continued upward into the vertical back of the chute, so that, as each loaf carrier 69 moves under the chute 234 in the direction of the arrow in Fig. 23, the longer confining fingers 76 act to push against the lowermost of a column of loaves within the chute. This loaf is thus pushed out of the chute, and down the inclined grid until it finally falls into place between the two sets of confining fingers 76 on the loaf carrier. This permits the entire column of loaves to move down and bring another loaf into place for withdrawal.

Thus far the preferred construction and operation of the paper-applying unit have been described, and it will be understood that this unit is preferably combined with a folding unit, to which a loaf with paper applied is conveyed at the same time that a new loaf is brought by the conveyer within the active scope of the paper-applying unit. In the preferred form shown, the folding unit comprises a steadying device, initial folders, side folders and final folders, and I prefer to combine these with an adherent-applying means which operates automatically in harmony with these various folding devices. Figs. 1, and 26 to 31 inclusive best show the details of the folding unit in the embodiment of my invention which I have selected for illustration.

As the loaf comes to rest upon the conveyer within the active scope of the folding unit, the steadying device preferably operates to hold the loaf during the folding operation. In the form shown this comprises a steadying plate 236 mounted upon an upright stem 237 adapted to slide vertically over the loaf within fixed guides 238, and normally pressed downward against the top of the loaf by a spring 239. In Fig. 29, this device is shown supported by the cam 240 acting on the roller 241 on the stem 237. This cam is mounted upon the shaft 168 already described. As the cam 240 turns as indicated by the arrow in Fig. 29 it lets the spring 239 act to press the plate 236 down upon the loaf. The initial folders then come into play.

These comprise a suitably shaped folding blade 242 on each side of the machine, (end of the loaf) which blades are mounted upon rods 243 pivotally mounted upon a bar 244, preferably made adjustable in length, as shown, which bar is fixed firmly to a guide rod 245, supported by a roller 246 upon the cam 247 on the shaft 168, and guided for vertical motion in the fixed guide plates 238. The spring 248, whose opposite ends are attached to the inturned arms 249 on the upper ends of the rods 243, tends constantly to draw said upper ends together, and thus keep said rods parallel and vertical in planes so located that, when the cam 247 permits the bar 244 to fall, the blades 242 will act to fold down the top of the paper close against the two ends of the loaf.

When the cam 247 raises the bar 244, and with it the rods 243 and blades 242, outward arms 250 on the rods 243 come up under fixed stops 251, at such a time that, when the folder is fully raised (as in Fig. 29) the rods 243 will be inclined toward each other as shown in the drawing. This gives room for operation of the adherent-applying means hereinafter described.

The initial folder having thus performed its part, the side folders act to turn in the upstanding sides of the projecting paper at both ends of the loaf. In the preferred form shown, this is accomplished by side-folding plates 252, located in opposed pairs at opposite sides of the machine just opposite the ends of the loaf when in position. These plates are slotted, as shown, and are supported upon pins 253 joining the parallel bars 254 of a movable frame mounted upon guide rods 255 having collars 256 behind which the springs 257 act to permit temporary outward movement of the frame bars 254 and the elements they support, to accommodate slight variations in size of the loaf.

At their lower ends the plates 252 have arms 258 pivotally connected with rods 259 whose opposite extremities are pivotally connected to the ends of longitudinal bars 260 fixed to a common cross bar 261. This cross bar carries a roller 262 which is held down upon the cam 263 by a spring 264. The ends of the cross bar 261 are preferably steadied by guide rods 265.

At the proper moment, the cam 263, on the shaft 51, lifts the bar 261, and the rods 259 raise the plates 252, causing them first to rise vertically and then, impelled first by their slots and finally by the rotative action of the arms 258, to tilt inward toward each other as indicated in dotted lines in Fig. 28. The springs 266 permit the necessary outward movements of the rods 259, and insure their return to the normal position shown.

In order that one plate 258 may move slightly in advance of the other the operative connections for one or the other include provision for a small lost motion. For instance one of the rods 259 has a spring-pressed slot and pin connection with its corresponding bar 260, and its plate 252 has a somewhat shorter slot. It results that the corresponding plate 252 starts to tilt a little before the other plate in the same pair, and thus overlapping side folds are produced at both ends of the loaf.

The final folder begins to move shortly after the side folders, but these latter complete their work and are withdrawn before the action of the final folder is completed. When an adherent-depositing device is employed there should, of course, be provided a sufficient interval for its action as well. I shall first describe the final folder as used without the adherent-depositing device and then explain the action of such device as preferably used.

At each side of the machine, and directly beneath each end of the loaf when in position, is located a vertically sliding support or plate 266ª. This is preferably mounted to slide between the plates or bars 254, and is normally held down by the spring 267 attached to an arm 268. As shown in Fig. 28 I prefer to provide slot and pin guides for this sliding support. To the top of each support 266ª is hinged a final folding plate 269, each connected by a pivoted connecting bar 270 to one upright arm of the frame 271. The frame 271 carries a roller 272 which rests upon a cam 273 on the shaft 51, being held to said cam by the spring 274.

As the cam 273 lifts the frame 271, its arms first tilt the plate 269 into the position shown in full lines in Fig. 30, and then, causing the support 266ª to slide upward, the plate 269 is made powerfully to smooth down and flatten the final upward compound paper fold which is produced by the original tilting motion. This action is indicated by the upper dotted lines in Fig. 30. Where my machine is intended for use with a binding unit, or the loaves are to be tied or pasted by hand, the mechanism thus far described will suffice, and my invention is not limited to a machine having additional features.

The construction described, however, is adapted to combination with means for securing the paper by an adherent, and I have therefore shown means for this purpose which are combined with the mechanisms already described. While my invention is broad enough to cover a variety of devices for this purpose, I prefer the construction shown in Figs. 26 and 27, whereby hot paraffin is efficiently transferred and applied to each wrapped loaf so as to secure the final or closing fold in place.

I employ a paraffin tank 275 on each side of the folding unit, the same being provided with electric coils 276, or other heating means whereby the paraffin is kept melted. An adherent-transferring device is adapted to be moved from a position directly above the tank toward the wrapped loaf and back and this device moves in a frame 277 carried by the parallel pivoted bars 278, 279, and comprises a sliding body 280, from which depends the wiping plate 281. The body 280 is preferably provided with heating means, whereby the wiping plate is kept hot. I have indicated electric coils for this purpose.

A pressure plate 282 is attached to the body 280, and a plunger 283 is pressed upward under said plate by a spring 284. This keeps the body 280 and the wiping plate normally in the position shown in the drawings.

In order to secure a layer of paraffin (or other adherent) upon the faces of the wiping plate 281, a plate-depressing device is used, which has the following construction in my preferred form. As shown in Fig. 26, a depressing frame 285 extends across the machine above the loaf which is being infolded, and this frame is provided with vertical guide bars 286, moving in brackets 287 fixed to the main framework. From the frame 285, directly over each pressure plate 282, there depends a pressure arm 288, and near the middle of the frame is a roller 289, which is held up against the cam 290 on the shaft 168 by the springs 291 (omitted on one side in Fig. 26).

While the initial and side folding is going on as described, the frame 277 on each side remains as shown in Fig. 26, and the cam 290 acts momentarily to depress the frame 285, whose pressure arms 288 cause the body 280 and wiping plate 281 to move down until the latter enters the tank 275. As the frame 285 rises again, the springs 284 withdraw the wiping plates from the tanks, and the scrapers 292, normally pressed together by springs 293, remove the superfluous paraffin from said plates.

The transferring cam 293 on the shaft 51, then acts, through the roller 294, levers 295 and rods 296 connected to the prolongations of the bars 279, to permit the spring 297 to move the frames 277 downward toward the loaf, as shown in dotted lines in Fig. 26, thus bringing the paraffin-covered wiping plates 281 against the wrapper on each side just after withdrawal of the side folding plates.

Shortly afterward the plates 269 fold the paper upward against the outer face of each wiping plate 281, and at once the cam 293 acts against the spring 297 to restore the parts to the position shown in Fig. 26, and, as the plates 281 are withdrawn upward from between the paper folds, they wipe off a certain amount of paraffin upon each. Thereafter the upward smoothing action of the final folding plate 269 takes place, and a firm and permanent adherence is secured.

This completes the formation and secure closing of the package, and the conveyer at once removes the same from the scope of action of the folding unit, delivering it to any device suitable for its reception, as, for instance, the curved smooth fingers 298 (Fig. 1) which occupy the longitudinal spaces 75 at the bottom of each loaf carrier as it passes, and upon which the loaves are pushed one by one, as the carriers are moved downward around the terminal wheel 55.

The various elements described herein in detail are to be understood each as the representative of a variety of obvious equivalents. Many changes may be made in the machine without departing from the scope of my invention, and I do not limit myself to the details herein shown and described.

What I claim is—

1. In a packaging machine a movable conveyer, a delivery chute, supporting fingers forming an extension of said chute at the delivery end thereof, and carriers on said conveyer having confining fingers adapted to enter the spaces between said supporting fingers on said chute when each carrier is moved past said chute by said conveyer, substantially as described.

2. In a packaging machine a movable conveyer, a delivery chute, supporting fingers at the delivery end thereof forming an extension of said chute and inclining downward toward said conveyer, and carriers on said conveyer provided with lifting blocks, spaced so as to accommodate said fingers, and with confining fingers adapted to enter the spaces between said supporting fingers on said chute when each carrier is moved past said chute by said conveyer, substantially as described.

3. In a packaging machine, a movable conveyer, a delivery chute, supporting fingers forming an extension of said chute at the delivery end thereof, and carriers on said conveyer having confining fingers with ends bent backward and downward and mounted resiliently upon the rear thereof and adapted to enter the spaces between said supporting fingers on said chute when each carrier is moved past said chute by said conveyer, substantially as described.

4. In a packaging machine, a movable conveyer, a delivery chute, means for removing articles from said chute to said conveyer, and a movable resistant body over said conveyer near the point of delivery adapted to maintain contact with each article after it is deposited on the conveyer to steady the same, substantially as described.

5. In a packaging machine, a movable conveyer, a delivery chute, means moving with the conveyer for removing articles from the chute to the conveyer, and a steadying device for the article placed over the conveyer, substantially as described.

6. In a packaging machine, jaws for leading paper around an article, gears upon which said jaws are mounted, a package support located between said gears and paper feeding means driven by said gears for delivering paper to said jaws, substantially as described.

7. In a packaging machine, jaws mounted for orbital motion, means for intermittently advancing paper toward the same, automatic cutting means, and an automatic paper accelerator adapted to project the severed sheet toward said jaws at a speed greater than that of said jaws after each operation of said cutting means, substantially as described.

8. In a packaging machine, jaws mounted for orbital motion, means for advancing paper toward the same, an automatic reciprocating accelerator adapted to project the paper at a momentarily increased speed toward said jaws, and automatic means for controlling action of said jaws, substantially as described.

9. In a packaging machine, jaws mounted for orbital motion, means for advancing paper toward the same, cutting means, an automatic accelerator adapted to project the severed sheet toward said jaws at a speed greater than that of said jaws, a driving shaft and cams thereon, connected for operation respectively with said accelerator and said cutting means, substantially as described.

10. In a packaging machine, normally closed jaws, means for producing orbital movement thereof, means for causing momentary opening thereof, means for intermittently advancing a paper sheet toward said jaws, and an accelerator adapted automatically to project the paper between said jaws at a speed greater than that of said jaws while the latter are momentarily open, substantially as described.

11. In a packaging machine, a rotatable ring, a jaw carrier projecting inward from the same, a fixed and a movable jaw on said carrier, means for normally closing said jaws, a plate on said movable jaw having projections, a lever pivotally mounted on said ring having one end playing between said projections, and means adapted to press upon the opposite end of said lever to cause the same to open said jaws, substantially as described.

12. In a packaging machine, rotatable rings, jaw carriers projecting inward from the same, a fixed and a movable jaw on said carriers, means for normally closing said jaws, means on one of said rings for opening said jaws, tripping means adapted to be brought into one portion of the path of movement of said opening, means for operating the same, a second tripping means adapted to be brought into another portion of said path of movement for similar operation, a mechanical connection between said two tripping means adapted to cause them to operate simultaneously, and a common actuating device for said two tripping means, substantially as described.

13. In a packaging machine, fixed supporting rollers, jaw-supporting gear wheels having internal grooves fitting over said rollers, jaw carriers projecting inward from said rings, and jaws on said carriers, substantially as described.

14. In a packaging machine, a paper feed, jaw-supporting gear wheels, a package carrier between said gear wheels, jaw carriers projecting inward therefrom, jaws on said carriers, driving means for said paper feed, and a toothed wheel meshing with said jaw-supporting wheels for actuating said driving means, substantially as described.

15. In a packaging machine, jaws for gripping the paper, means for delivering paper to said jaws including a device for exerting a frictional resistance to extraction of the paper by said jaws, a package holder, and means for automatically carrying said jaws in an orbital path around said package holder, substantially as described.

16. A packaging machine, comprising in combination, a lifting body adapted to support an article to be wrapped, a support for the same upon which said body is slidably mounted, means for raising and lowering said support, and means for causing said body to slide upon said support, substantially as described.

17. A packaging machine, comprising in combination a lifting body, a tension body, a common support upon which both of said bodies are slidably supported, means for raising and lowering said support and means for causing said bodies to slide in appropriate relation to each other upon said support, substantially as described.

18. A packaging machine, comprising in combination a slidable lifting body, a tension body mounted for sliding parallel with said lifting body, lifting means for the two bodies, and means for causing successive advance of said bodies, substantially as described.

19. A packaging machine comprising in combination a slidable lifting body, a tension body mounted for sliding parallel with said lifting body, lifting means for the two bodies, means for causing said lifting body to engage with and move said tension body on reverse movement of the former, and means for causing successive forward movement and simultaneous backward movement of said bodies, substantially as described.

20. In a packaging machine, a lifting body, a slidable spring-pressed centering device mounted thereon, supporting means for raising and lowering said body and means for causing said body to slide back and forth on said supporting means, substantially as described.

21. In a packaging machine, a lifting body, lifting blades projecting from the same, supporting means for raising and lowering the same, and means for causing said body to slide back and forth on said supporting means, substantially as described.

22. In a packaging machine, a lifting box, means for raising and lowering the same, a lifting body, means for causing said body to slide on said box, lifting blades on said body, and a centering device on said body, substantially as described.

23. In a packaging machine, a lifting box, means for raising and lowering the same, a tension body on said box, means for causing said body to slide on said box, and tension blades on said body, substantially as described.

24. In a packaging machine, a lifting box, means for raising and lowering the same, a tension body on said box, means for causing said body to slide on said box and tension blades on said body adapted to swing across the line of sliding movement thereof, substantially as described.

25. In a packaging machine, a lifting box, means for raising and lowering the same, a tension body on said box, means for causing said body to slide on said box, tension blades projecting horizontally therefrom, means tending to lift said blades, and means adapted to hold said blades normally down and to release them to permit upward movement thereof when said body is fully advanced in one direction, substantially as described.

26. In a packaging machine, a lifting box, means for raising and lowering the same, a tension body on said box, means for causing said body to slide on said box, tension blades projecting horizontally therefrom and provided with upward projections, and guide ribs over said projections having each a cavity for receiving said projections when said tension body is advanced forward, substantially as described.

27. In a packaging machine, a lifting box, means for raising and lowering the same, a slidable lifting body on said box having lifting blades and guide ribs provided with cavities, a slidable tension body also on said box beneath said lifting body, tension blades on said latter body having upward projections adapted to slide along said ribs and drop into said cavities, said latter blades being mounted in a resilient manner on said tension body, substantially as described.

28. In a packaging machine a longitudinally movable conveyer, a lifting body on each side thereof, means for causing said bodies to advance toward said conveyer, and means adapted to raise and lower said bodies simultaneously, while in their advanced position, substantially as described.

29. In a packaging machine a longitudinally movable conveyer, a lifting body on each side thereof, a tension body also on each side thereof, means for causing said lifting bodies to move toward said conveyer, means for causing subsequent advance of said tension bodies toward said conveyer, and means for causing all of said bodies to be simultaneously raised and lowered, substantially as described.

30. In a packaging machine, a lifting box, a lifting body adapted to slide thereon, a swinging arm, a swinging connection between the end thereof and said body, means for raising and lowering said box, and automatic means for swinging said arm to cause sliding movements of said body, substantially as described.

31. In a packaging machine, a lifting box, a tension body adapted to slide thereon, a lateral projection on said body, a swinging arm adapted to maintain contact at one end with said projection whether raised or lowered, means for raising and lowering said box, and means for swinging said arm, substantially as described.

32. In a packaging machine, a support, a tension body mounted slidably thereon and having a lateral projection, means for raising and lowering said support, a swinging arm adapted to press said support, and automatic means for causing said arm to push said tension body forward and then swing back leaving said body in its advanced position, substantially as described.

33. In a packaging machine, a lifting box, a tension body adapted to slide thereon, a lateral projection on said body, a swinging arm adapted to maintain contact at one end with said projection whether raised or lowered, a lifting body in said box, a swinging arm adapted to cause the same to slide back and forth on said box, an actuating device for said latter arm, a lifting means for said box, an actuating device for said former arm, and means for causing successive operation of said actuating devices and lifting means in the order named, substantially as described.

34. In a packaging machine, slidable lifting bodies on opposite sides thereof, swinging arms connected at their outer ends with said bodies, a cam arranged to cause inward swinging of one of said arms, a second cam arranged to cause outward movement of the other arm, and a mechanical connection between said arms for insuring simultaneous inward and outward swinging thereof, substantially as described.

35. In a packaging machine, slidable tension bodies on opposite sides thereof, swinging arms arranged so that their outer ends control movement of said bodies, a spring tending to draw said arms together, a cam arranged to swing one of said arms outward against the effort of said spring, and a mechanical connection between said arms, for insuring simultaneous inward and outward swinging thereof, substantially as described.

36. In a packaging machine, a longitudinally movable conveyer, a cross bar beneath the same, a vertical stem near each end thereof, a sheet retaining plate on each stem, a spring for supporting each stem and plate, and means for automatically raising and lowering said cross bar so as to cause said plates to rise and fall on each side of said conveyer, substantially as described.

37. In the folding unit of a packaging machine an initial folder having rods capable of swinging movement, means tending to maintain said rods substantially parallel to each other, means for moving said rods up and down, and stops arranged to make contact with said rods when they are retracted, for swinging their lower ends nearer together, substantially as described.

38. In the folding unit of a packaging machine, a substantially horizontal bar made adjustable as to length and extending across the machine, rods depending from the ends thereof, means on said rods adapted to form folds in tubularly arranged paper, and means for raising and lowering said horizontal bar, substantially as described.

39. In the folding unit of a packaging machine, a substantially horizontal bar made adjustable as to length and extending across the machine, rods depending from the ends thereof, means on said rods adapted to form folds in tubularly arranged paper, means tending to keep said rods substantially vertical, means for moving said bar up and down, and stops arranged to make contact with said rods when raised, for swinging them out of parallelism, substantially as described.

40. In the initial folder of a packaging machine, a vertically movable rod mounted for swinging movement, a spring tending to hold the same in a substantially vertical position, an outwardly turned arm on said rod, a stop above said arm, and means for alternately lowering said rod and raising it so that said arm is tilted by said stop, substantially as described.

41. In the folding unit of a packaging machine, and in combination with the conveyer thereof, a spring pressed slidable frame beside said conveyer, folding plates adapted to swing on said frame, substantially parallel to its length, and means for swinging said plates, substantially as described.

42. In the folding unit of a packaging machine, and in combination with the conveyer thereof, a spring pressed slidable frame beside said conveyer, a folding plate adapted to swing on said frame on an axis substantially parallel to the length of the frame, and means for swinging said plate, substantially as described.

43. In the folding unit of a packaging machine, and in combination with the conveyer thereof, a spring-pressed slidable frame beside said conveyer, a folding plate mounted thereon so as to both slide and tilt in its own plane parallel to said conveyer, and means for successively sliding and tilting said folding plate on said frame, substantially as described.

44. In the folding unit of a packaging machine, a pair of side folding plates mounted for sliding and tilting in substantially the same plane; in combination with automatic means for causing said plates first to slide into folding position and then to tilt toward each other, substantially as described.

45. In the folding unit of a packaging machine, a pair of side folding plates having longitudinal slots, pins for supporting said plates passing into said slots, and means for sliding said plates upward and then tilting them around said pins, substantially as described.

46. In the folding unit of a packaging machine, a pair of side folding plates having longitudinal slots, pins for supporting said plates passing into said slots, and means for sliding said plates upward and then tilting them around said pins, said means including a connection allowing for lost motion on one of said plates, substantially as described.

47. In the folding unit of a packaging machine, and in combination with the conveyer thereof, a spring-pressed slidable frame beside said conveyer, a folding plate mounted slidably and rotatably on said frame, and means for imparting this double movement to said plate, substantially as described.

48. In the folding unit of a packaging machine, a vertically slidable plate, a swinging folding plate mounted thereon, means tending to depress said slidable plate, and means for successively swinging the folding plate and lifting both plates, substantially as described.

49. In the folding unit of a packaging machine, a pair of substantially parallel side folding plates, a final folding plate, mountings for all of said plates adapted to permit both sliding and tilting movements, and automatic means for producing such movements in appropriate order in all of said plates, substantially as described.

50. In the folding and gumming unit of a packaging machine, an adherent-transferring device, a plurality of folding devices, means for causing said folding devices to operate in appropriate sequence and means adapted to cause said adherent-transferring device to move temporarily under a fold made by said folding devices, whereby a suitable adherent is placed upon said fold to secure the same, substantially as described.

51. In the folding and gumming unit of a packaging machine, an adherent-transferring device, a receptacle for an adherent, automatic means for folding paper, and automatic means for successively dipping said adherent-transferring device into said receptacle and introducing it under a fold in said paper, substantially as described.

52. In the folding and gumming unit of a packaging machine, an adherent-transferring device, automatic means for folding paper onto an object to be wrapped, and automatic means for causing said adherent-transferring device to move into contact with the under face of a fold in said paper and then to be drawn away across the face of the same, substantially as described.

53. In the gumming unit of a packaging machine, a frame, a slidable body therein, a wiping plate on said body, parallel pivoted bars for supporting said frame, a receptacle for an adherent, automatic means for causing said body to slide through said frame for dipping said plate into said receptacle, and automatic means for tilting said parallel bars, substantially as described.

54. In the gumming unit of a packaging machine, a package carrier, an adherent-transferring device, a receptacle for an adherent, heating means connected with said transferring device, means for dipping said transferring device at intervals into said receptacle, and means for moving said transferring device toward said package carrier, substantially as described.

In testimony whereof, I affix my signature, in presence of two witnesses.

ALBERT J. HADERT.

Witnesses:
    KATHARINE C. MEAD,
    H. S. MACKAYE.